Jan. 9, 1934.  L. M. APPLEGATE  1,942,740
ELECTROMECHANICAL SYSTEM
Filed June 2, 1931
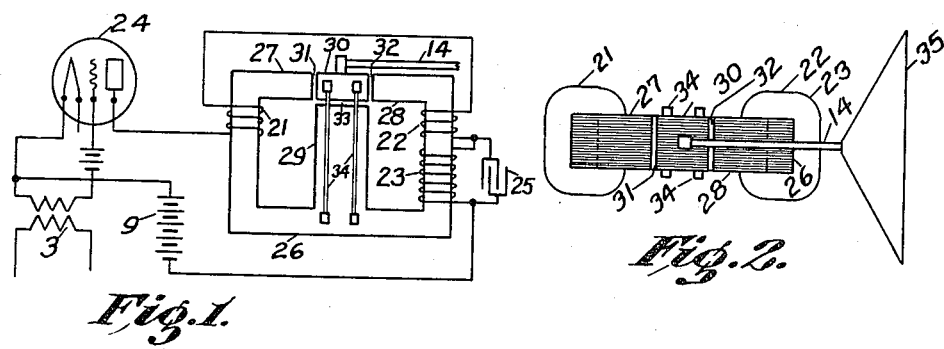
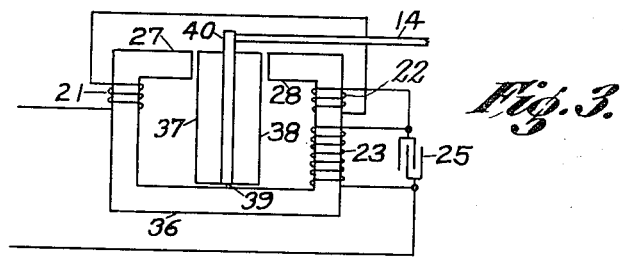
Inventor
Lindsay M. Applegate Patented Jan. 9, 1934

1,942,740

UNITED STATES PATENT OFFICE 1,942,740

ELECTROMECHANICAL SYSTEM

Lindsay M. Applegate, Seattle, Wash.

Application June 2, 1931. Serial No. 541,580

20 Claims. (Cl. 175—338)

My present invention relates to the conversion of electrical energy into mechanical energy, for applications such as the operation of loud speakers. This invention is related to a previous invention of mine disclosed in a co-pending application, Serial No. 491,511.

In that application, a system for converting the electrical energy of a push-pull circuit into mechanical energy is shown. A push-pull circuit provides two undulating unidirectional currents, one of which increases when the other decreases and vice versa. These two currents can be utilized for producing two magnetic fluxes similarly undulating, and these two fluxes when coacting on suitable movable magnetic means, can produce oscillatory motion. This motion can be produced when two fluxes as described are present, without the aid of polarizing fluxes, which are usually provided by permanent magnets or solenoids. When undulating direct current fluxes, such as are usually produced by a single undulating current are used, a polarizing flux is required. It is the purpose of this invention to accomplish with a single undulating unidirectional current substantially what is accomplished with two oppositely undulating unidirectional currents, as set forth in my application, Serial No. 491,511.

What constitutes my present invention, I have set forth in the specification following, and succinctly defined in the appended claims.

In this specification, Figure I is a diagrammatic representation of my invention in one form of embodiment.

Figure II is a plan view of my invention.

Figure III is a diagrammatic representation of my invention used for purposes of explanation.

The arrangement shown in Figure I receives energy from a single audion. Energy is delivered to three coils 21, 22, and 23 by an audion 24. Coil 23 is paralleled by a condenser 25, whose impedance at operating frequencies is relatively low in comparison with the impedance of coil 23. A magnetic frame 26 with poles 27, 28, which are designated as "actuating poles" and pole 29 which is designated as a "neutral pole" is electromagnetically associated with coils 21, 22, and 23. A movable magnetic element 30 is supported between poles 27 and 28 by flexible members 34, which hold element 30 in such a position as to maintain a substantially uniform airgap 33, and to permit element 30 to oscillate between poles 27 and 28. Two airgaps 31 and 32 between pole 27 and element 30, and between element 30 and pole 28, respectively, permit the movement required of element 30. Motion of element 30 is communicated by a mechanical connection 14 to other mechanical elements, for example a loud speaker cone 35. The polarities of coils 21, 22, and 23 are arranged so that coils 22 and 23 are in opposition. Coil 23 has more turns than coil 22, preferably twice as many. The resultant magnetomotive force of coils 22 and 23 is therefore in the direction of the magnetomotive force of coil 23, which may be in either direction. The magnetomotive force of coil 21 may also be in either direction. Accordingly, it is evident that the magnetomotive forces of coils 21 and 23 may be in the same direction through element 30, or in opposite directions. If they are in the same direction, and if the current is unvarying, pole 29 and airgap 33 will carry practically no flux, whereas if they are in opposite directions, pole 29 and airgap 33 will carry the combined fluxes of poles 27 and 28.

For purposes of explanation, let it first be assumed that the polarities are such that the magnetomotive forces of coils 23 and 21 are in the same direction, and that the current delivered by audion 24 increases. Part of the current flowing in coil 22 and the rest of the circuit will flow in condenser 25, and the remaining part in coil 23. Then the resultant magnetomotive force of coils 22 and 23 will decrease and that of coil 21 will increase. Consequently, the flux in airgap 31 will increase and the flux in airgap 32 will decrease, with the result that element 30 will move toward pole 27. Since the fluxes in poles 27 and 28 are not equal, flux will exist in pole 29. If the current in the circuit decreases, the magnetomotive forces of coils 21 and 22 will decrease. The magnetomotive force of coil 23 will decrease slightly, but the effect of condenser 25 will be to prevent much variation of current in coil 23. The resultant effect will be an increase of the flux in airgap 32 and a decrease of the flux in airgap 31, and consequently a movement of element 30 toward pole 28.

Now, let it be assumed that the polarities of coils 21, 22, and 23 are such that the fluxes in poles 27 and 28 are in opposite directions. When the current in the circuit is unvarying, the fluxes in poles 27 and 28 will be practically equal, and will be combined in pole 29. If the current in the circuit increases, the magnetomotive force of coil 21 will increase and the resultant magnetomotive force of coils 22 and 23 will decrease. The increase of flux in pole 27 will be approximately the same as the decrease of flux in pole 28 and, therefore, the flux in pole 29 will remain substantially constant. A decrease in current will cause a decrease of magnetomotive force in coil 21 and an increase of resultant magnetomotive force in coils 22 and 23. In the flux changes described above, in which one flux varies proportionally with the undulations of the exciting current, and the other flux substantially inversely with undulations of the exciting current, the phase relationships of the two fluxes are described by the statement that the phase difference between the two fluxes is substantially 180 electrical degrees.

In Figure I, the operation of the system depends upon the simultaneous increase of magnetomotive force in one actuating pole and decrease of magnetomotive force in another actuating pole. In Figure I this is accomplished by a novel combination of coils in series, one of which is paralleled by a condenser, connected to a single circuit. It is not necessary to adhere to the mechanical form of the system as shown in Figures I and II to utilize the coil system of Figure I. Figure III shows an arrangement in which the electrical circuit shown in Figure I is used with a different mechanical structure. Figure III differs from Figure I in that instead of having a neutral pole common to both actuating poles, the moving element is composed of two magnetic parts 37 and 38, each individually associated with one of the actuating poles 27 and 28 respectively. Parts 37 and 38 are separated by a nonmagnetic part 40, and they are supported in a magnetic frame 36 by a flexible connection 39. Poles 27 and 28 alternately increase and decrease in strength as in Figure I. Part 37 is attracted by pole 27 alternately more and less than part 38 is attracted by pole 28, with resultant oscillation of elements 37, 38, 40, and 14. In an arrangement of the kind shown in Figure III, each of the parts 37 and 38 are subject to the same flux variations as are the actuating poles 27 and 28 with which they are associated. This necessitates their being of substantially the same cross-section as the poles themselves, and causes them to incur approximately the same unit hysteresis and eddy current losses.

In the arrangement shown in Figure I, the neutral pole may carry either the fluxes of the actuating poles combined, which is substantially constant, or the difference between the actuating pole fluxes, which will be alternating and usually of a magnitude less than the magnitude of the combined actuating pole fluxes. Making the polarities of the actuating poles such that the neutral pole carries the combined flux of both eliminates hysteresis and eddy current losses in the neutral pole. Making the polarities of the actuating poles such that the neutral pole carries the difference between the two actuating pole fluxes, usually enables the neutral pole to be made smaller without incurring excessive flux densities therein. This arrangement of the polarities enables the size of the moving element to be made a minimum.

In the circuits shown in Figures I and III, there is a secondary action which takes place in coils 22 and 23, condenser 25, and pole 28. This is the effect of the counter electromotive force generated in coil 23 when coil 22 causes a change in the flux in pole 28. The counter electromotive force generated in coil 23 is in such a direction that the resultant current tends to counteract the change in flux that is producing it. The effect of this secondary action is to inhibit the changes in flux in pole 28 to an extent which is dependent upon the characteristics of the coil assembly, particularly upon the resistance and leakage reactance of coil 23. If the leakage reactance of coil 23 is such that its leakage flux is a substantial proportion of its total flux, the current produced in opposition to changes in flux in pole 28 will have less effect than if the leakage reactance is small. If the leakage reactance is very large, the number of turns in coil 23 should be greater than twice as many as in coil 22, as recommended above. If the resistance and leakage reactance of coil 23 are both very low, the counter electromotive force and the resultant current will inhibit the change in flux in pole 28 materially. If the limiting condition, in which the flux changes in pole 28 are almost prevented, be approached, the resultant effect is that the undulating ampere turns of coil 22 are equalized by currents circulating in coil 23 and condenser 25. That is, the net result is the same as if coil 22 were eliminated and the number of turns in coil 23 were reduced to equal the number of turns in coil 21. Under these conditions, undulating current would cause the flux in pole 27 to increase and decrease alternately relative to the flux in pole 28. Inasmuch as the flux in pole 28 would remain substantially constant or would increase and decrease slightly, in synchronism with the flux changes in pole 28, certain of the advantages inherent in the use of both coils 22 and 23 would be lost. One disadvantage of constant, or nearly constant, flux in pole 28 is that, regardless of the relative polarity of the coils, pole 29 is subject to substantially the same flux changes as occur in pole 27. The flux changes in pole 29 may, of course, be superimposed on a unidirectional flux therein, or may be alternating, depending upon the relative polarities of poles 27 and 28. Another disadvantage is that when only one of the two poles 27 and 28 carry an active flux and the other carries an unchanging flux, the amount of magnetic material required for a given power output is more than when both poles are active. Accordingly, it follows that for optimum characteristics of operation, coil 23 would have appreciable leakage reactance and resistance.

It is possible to obtain an oscillatory motion of the movable element 30 in Figure I when one of the coils is disconnected, although the best results are obtained with both coils in operation. The way in which motion is obtained with only one coil in service is as follows: A current in coil 21, for example, will cause magnetic flux to exist in all three poles 28 and 29 as well as in pole 27. When the current in coil 21 changes, the fluxes in all parts of the magnetic circuit change. If, for example, the current in coil 21 decreases, the flux in pole 27 decreases. The flux existing in pole 29 also decreases, but, due to hysteresis and eddy current effects, tends to remain as nearly constant as possible, and therefore cause an increase of flux in pole 28. The result is a decrease of attraction between pole 27 and element 30, and an increase of attraction between pole 28 and element 30, with a consequent movement of element 30 toward pole 28. The opposite effect is observed when the current in coil 21 increases.

In Figure I, the flexible supporting members 34 usually are sufficiently stiff to prevent the moving element from coming in contact with either of the actuating poles 27 or 28, when only one of the coils 21 or 22 is carrying current. In Figure III, the flexible connection 39 is made sufficiently elastic to prevent excessive movement of elements 37, 38, and 40.

I claim:

1. The method of causing two magnetic circuits of a three-pole magnetic structure to have magnetic fluxes which increase and decrease alternately, the flux of one increasing when the flux of the other is decreasing, which consists of acting electromagnetically on said magnetic circuits with an undulating unidirectional current, the current causing in one of said magnetic circuits an undulating flux substantially proportional to said current, and causing in the other of said magnetic circuits an undulating flux which undulates in magnitude, decreasing when said current increases and increasing when said current decreases.

2. A method of causing an undulating unidirectional current to produce motion, which consists of causing said undulating unidirectional current to produce two unequal magnetomotive forces, the magnitude of the greater magnetomotive force changing relatively little, the magnitude of the lesser magnetomotive force being substantially proportional to said unidirectional current and undulating in proportion to the undulations of said unidirectional current, combining the two magnetomotive forces in opposition thereby producing a resultant magnetomotive force whose magnitude is equal to the difference between the magnitude of said greater magnetomotive force and the magnitude of said lesser magnetomotive force, causing said resultant magnetomotive force to produce a magnetic flux substantially proportional thereto, causing said undulating unidirectional current to produce a second magnetic flux which is substantially proportional to said current, and causing said two magnetic fluxes to coact on movable magnetic means, causing motion thereof.

3. An electromechanical system comprising a three-pole magnetic structure, a moving element, a plurality of coils and an electric circuit associated therewith, which delivers to said coils undulating unidirectional currents so arranged that magnetic flux due to said currents exists in said three-pole structure, the flux in two of said poles alternately increasing and decreasing in accordance with the undulations of said currents, the flux in one pole increasing while the flux in the other pole is decreasing and vice versa, the third of said poles carrying a magnetic flux which is substantially equal to the difference between the fluxes in the first and second of said poles.

4. An electromechanical system comprising a three-pole magnetic structure, a moving element, a plurality of coils and an electric circuit associated therewith, which delivers to said coils undulating unidirectional currents so arranged that magnetic flux due to said currents exists in said three-pole structure, the flux in two of said poles alternately increasing and decreasing in accordance with the undulations of said currents, the flux in one pole increasing while the flux in the other pole is decreasing and vice versa, the third of said poles carrying a magnetic flux which is substantially equal to the difference between the fluxes in the first and second of said poles, and said moving element oscillating between the first two of said poles while remaining at a substantially unchanging distance from said third pole.

5. A three-pole electromagnetic system comprising two magnetic circuits, one of which is provided with two coils, one coil having more turns than the other and connected in parallel with a condenser, the other of said magnetic circuits being provided with a single coil, all of said coils being connected in series, and the whole being arranged so that when undulating unidirectional current is caused to flow in said coils, undulating magnetic fluxes are produced in said magnetic circuits, one magnetic flux decreasing when the other is increasing and vice versa.

6. An electromechanical system comprising a magnetic pole which is provided with two coils, one coil having more turns than the other and connected in parallel with a condenser, a second magnetic pole provided with a single coil, a third magnetic pole without coils, all of said coils being connected in series, and a moving magnetic element supported between said poles, the whole being arranged so that when undulating unidirectional current is caused to flow in said coils, the said movable magnetic element is caused to oscillate.

7. Means for causing an undulating unidirectional current to produce motion comprising means for producing from said current two unequal magnetomotive forces, the magnitude of the greater magnetomotive force changing relatively little, the magnitude of the lesser magnetomotive force being substantially proportional to said unidirectional current and undulating substantially in proportion to the undulations of said unidirectional current, means for combining the two magnetomotive forces in opposition and thereby producing a resultant magnetomotive force whose magnitude is equal substantially to the difference between the magnitude of said greater magnetomotive force and the magnitude of said lesser magnetomotive force, means for producing from said resultant magnetomotive force a magnetic flux which is substantially proportional thereto, means for producing a second magnetic flux which is substantially proportional to said current, and means for causing said two fluxes to coact on movable magnetic means, causing motion thereof.

8. An electromechanical system comprising a three-pole magnetic structure, a moving element, a plurality of coils and an electric circuit associated therewith, which delivers to said coils undulating unidirectional currents so arranged that magnetic fluxes due to said currents exist in said three-pole structure, the fluxes in two of said poles alternately increasing and decreasing in accordance with the undulations of said currents, the flux in one pole increasing while the flux in the other pole is decreasing and vice versa, the third of said poles carrying a magnetic flux which is the resultant of the combination of the fluxes in the first and second of said poles.

9. An electromechanical system comprising a three-pole magnetic structure, a moving element, a plurality of coils and an electric circuit associated therewith, which delivers to said coils undulating unidirectional currents so arranged that magnetic flux due to said currents exists in said three-pole structure, the flux in two of said poles alternately increasing and decreasing in accordance with the undulations of said currents, the flux in one pole increasing while the flux in the other pole is decreasing and vice versa, the third of said poles carrying a magnetic flux which is substantially equal to the sum of the fluxes in the first and second of said poles.

10. An electromechanical system comprising a three-pole magnetic structure, a moving element, a plurality of coils and an electric circuit associated therewith, which delivers to said coils undulating unidirectional currents so arranged that magnetic flux due to said currents exists in said three-pole structure, the flux in two of said poles alternately increasing and decreasing in accordance with the undulations of said currents, the flux in one pole increasing while the flux in the other pole is decreasing and vice versa, the third of said poles carrying a magnetic flux which is the resultant of the combination of the fluxes in the first and second of said poles, and said moving element oscillating relative to the first two of said poles while remaining at a substantially unchanging distance from said third pole.

11. An electromechanical system comprising a three-pole magnetic structure, a moving element, a plurality of coils and an electric circuit associated therewith, which delivers to said coils undulating unidirectional currents so arranged that magnetic flux due to said currents exists in said three-pole structure, the flux in two of said poles alternately increasing and decreasing in accordance with the undulations of said currents, the flux in one pole increasing while the flux in the other pole is decreasing and vice versa, the third of said poles carrying a magnetic flux which is the resultant of the additive combination of the fluxes in the first and second of said poles, and said moving element oscillating relative to the first two of said poles while remaining at a substantially unchanging distance from said third pole.

12. An electromechanical device comprising two magnetic circuits with a movable magnetic part common to both, one of said magnetic circuits being provided with two coils, one coil having more turns than the other and being connected in parallel with a condenser, the second of said magnetic circuits being provided with one coil, all of said coils being connected in series, the whole being arranged so that when undulating unidirectional current is caused to flow in said coils, said movable magnetic part is caused to oscillate.

13. A method of causing a single undulating unidirectional current to produce oscillatory motion which consists of causing said undulating unidirectional current to produce two magnetic fluxes substantially 180 electrical degrees apart in phase, and causing said magnetic fluxes to coact on movable magnetic means, causing motion thereof.

14. Means for converting the energy of a single undulating unidirectional current into energy of oscillatory motion, comprising means for deriving from said current two undulating magnetic fluxes substantially 180 electrical degrees apart in phase, means for bringing about the interaction of said fluxes, and means for producing motion resulting from the interaction of said fluxes.

15. An electromechanical system comprising a three-pole magnetic structure, two poles of which have coils which are connected in series, one coil of the assemblage being connected in parallel with a condenser, and a movable magnetic element placed to be able to oscillate relative to the two poles having coils, the coils receiving an undulating current thus producing undulating fluxes in the poles and causing the movable magnetic element to oscillate.

16. Means for producing oscillatory motion comprising two magnetic circuits having a movable magnetic part in common, the two magnetic circuits being provided with coils which are connected in series, one coil being connected in parallel with a condenser, the coils receiving an undulating current thereby causing the movable magnetic part to oscillate.

17. Means for producing oscillatory motion which consist of two magnetic circuits having a movable magnetic part common to both, the magnetic circuits being provided with coils, the coils being connected in series, one coil being connected in parallel with a condenser, the coils receiving an undulating current which produces fluxes in the two magnetic circuits, one flux undulating relative to the other, thus causing the movable magnetic part to oscillate.

18. Means for producing oscillatory motion consisting of two magnetic circuits having movable magnetic parts, the magnetic circuits being provided with coils which are connected in series, one coil of which is connected in parallel with a condenser, the coils receiving an undulating current, thereby causing the movable magnetic parts to oscillate.

19. Means for producing oscillatory motion which consist of two magnetic circuits having movable magnetic parts, the magnetic circuits being provided with coils which are connected in series, one coil of which is connected in parallel with a condenser, the coils receiving an undulating current which causes fluxes in the two magnetic circuits, one flux undulating relative to the other, thereby causing the movable magnetic parts to oscillate.

20. Means for producing oscillatory motion comprising two magnetic circuits both provided with coils and each with a movable magnetic part, the two movable magnetic parts being attached to each other, the coils being connected in series and one of them being connected in parallel with a condenser, the coils receiving an undulating current which, producing fluxes in the magnetic circuits, causes the movable magnetic parts to oscillate.

LINDSAY M. APPLEGATE.